(12) United States Patent
Hext

(10) Patent No.: US 6,357,682 B1
(45) Date of Patent: Mar. 19, 2002

(54) APPARATUS FOR PROCESSING MEDICAL WASTE

(75) Inventor: Bill R. Hext, Odessa, TX (US)

(73) Assignee: Positive Impact Waste Solutions, Inc., Odessa, TX (US)

( * ) Notice: Subject to any disclaimer, the term of this patent is extended or adjusted under 35 U.S.C. 154(b) by 0 days.

(21) Appl. No.: 09/659,368

(22) Filed: Sep. 12, 2000

(51) Int. Cl.⁷ .............................................. B02C 18/40
(52) U.S. Cl. ..................... 241/161; 241/260.1; 241/606
(58) Field of Search .............................. 241/606, 260.1, 241/161, 261

(56) References Cited

U.S. PATENT DOCUMENTS

| | | | |
|---|---|---|---|
| 5,048,766 A | 9/1991 | Gaylor et al. ................. | 241/65 |
| 5,402,948 A | * 4/1995 | Kaczmarek .................. | 241/73 |
| 5,673,861 A | 10/1997 | Miller ......................... | 241/69 |
| 5,732,892 A | 3/1998 | Neier ........................... | 241/30 |
| 5,799,880 A | 9/1998 | Roberson et al. ............... | 241/1 |
| 5,799,883 A | 9/1998 | Lewis et al. .................. | 241/21 |
| 5,845,855 A | 12/1998 | Yamada et al. ............... | 241/57 |
| 5,975,449 A | 11/1999 | Geyer ..................... | 241/260.1 |

\* cited by examiner

*Primary Examiner*—Allen Ostrager
*Assistant Examiner*—William Hong
(74) *Attorney, Agent, or Firm*—Akin, Gump, Strauss, Hauer & Feld, L.L.P.; B. R. Pravel

(57) ABSTRACT

An apparatus for converting unconsolidated medical waste into a non-hazardous medical waste residue, which apparatus has an improved cutter assembly provided by a rotating cutter assembly that has revolving teeth disposed at an oblique angle relative to the path of travel of the revolving teeth and to the stationary cutter assembly to force the waste material between the revolving and fixed teeth. An auger moves the waste material through the housing longitudinally to keep pressure on the opposing fixed and revolving teeth while grinding the material into a reduced particle size to facilitate its disposal or storage.

8 Claims, 6 Drawing Sheets

APPARATUS FOR PROCESSING MEDICAL WASTE

CROSS-REFERENCE TO RELATED APPLICATIONS

This application relates to a new and improved apparatus for processing medical waste, which is an improvement on U.S. Pat. No. 5,673,861 issued Oct. 7, 1997.

BACKGROUND OF THE INVENTION

1. Field of the Invention

This application relates to the field of medical waste treatment and disposal. Specifically, this application is for a new and improved apparatus for rendering medical waste non-recognizable by reason of a reaction with a sterilant and non-recognizable by reason of grinding, shredding and cutting the waste. Hospitals and other institutions must dispose of medical waste which is largely composed of infectious materials, including syringes, hypodermic needles, bandages, metal items, and even hospital gowns, sheets and blankets. Because of the diverse nature of the items which are placed in the medical waste for disposal, the apparatus must have the capability of reducing all of the waste to a small enough size for disposal in a manner which makes the medical waste suitable for storage, or other disposition as a non-infectious medical waste residue. The prior art cited in U.S. Pat. No. 5,673,861 generally discloses the background for this invention, which is an improvement over the apparatus disclosed in U.S. Pat. No. 5,673,861.

2. Description of the Related Art

SUMMARY OF THE INVENTION

The present invention provides a new and improved apparatus for converting unconsolidated medical waste into medical waste residue, which is of a reduced unrecognizable size for disposal in a landfill or the like.

The waste is cut, shredded and ground by revolving teeth on a rotating shaft which co-acts with fixed teeth in a housing. One or more of the revolving teeth is of special construction and disposition for moving at an oblique angle and in the same plane with respect to the fixed teeth to obtain an increased cutting, shredding, and grinding action on waste between the revolving and fixed teeth. During the mechanical process thus described, the waste is simultaneously revolved and is rendered non-infectious by mixing and reacting with a proprietary stimulant.

DETAILED DESCRIPTION OF INVENTION

Figure 1:
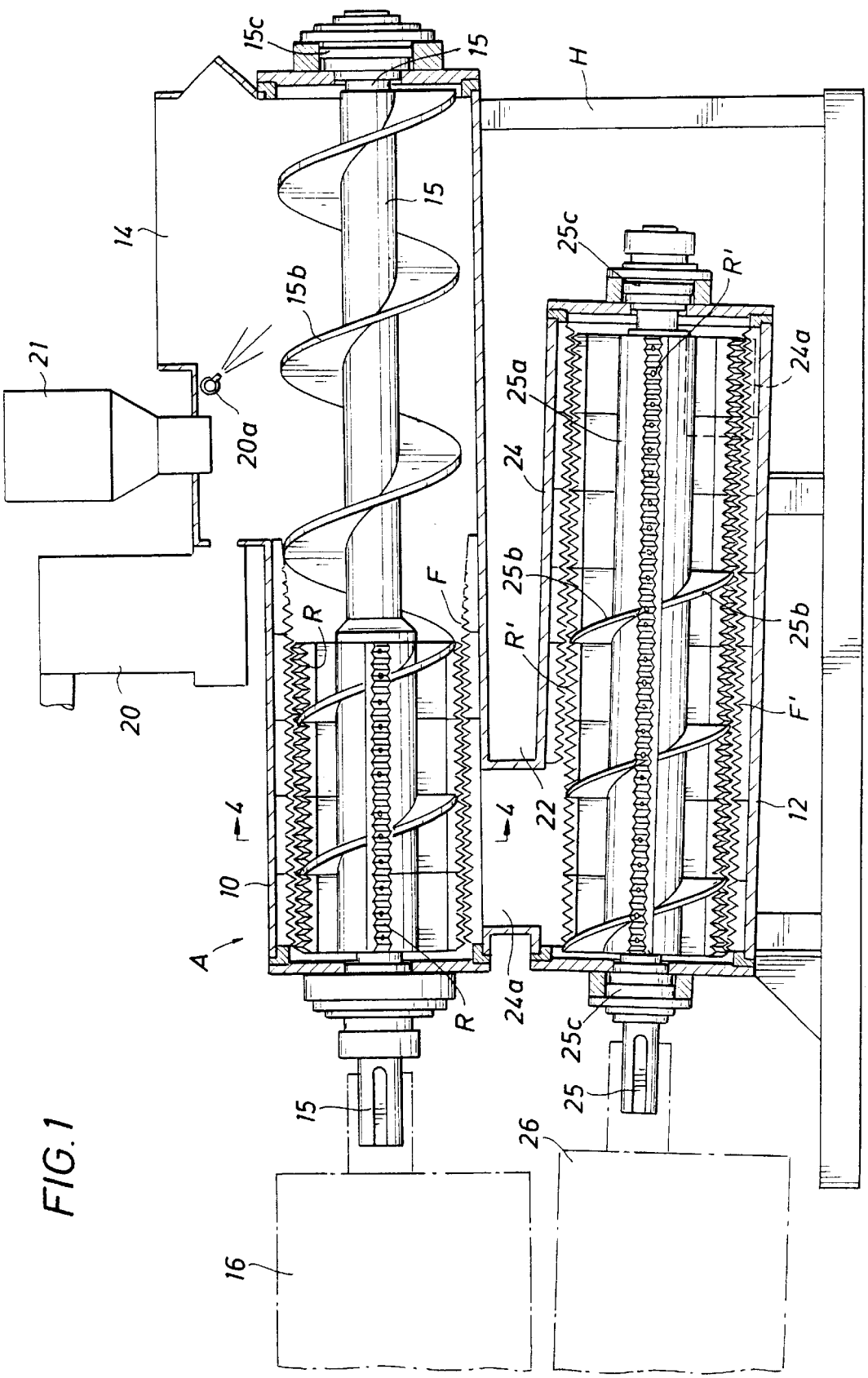
FIG. 1 is a elevation, partly in section illustrating the two-stage apparatus of this invention.
Figure 3:
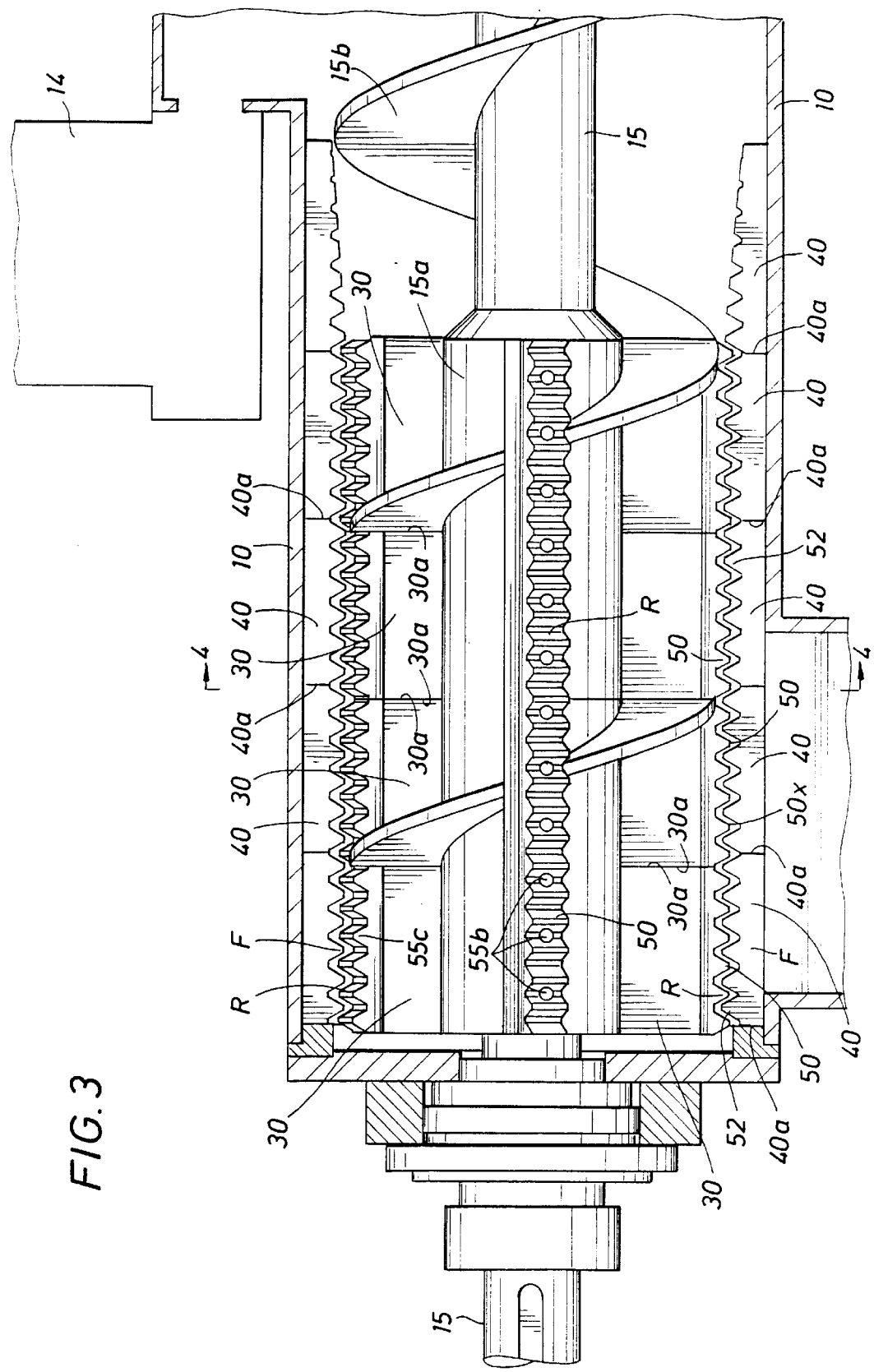
FIG. 3 is an enlarged view of a portion of the apparatus of FIG. 1, showing in more detail the relationship of the teeth in the upper pre-grinded chamber of the apparatus.
Figure 4:
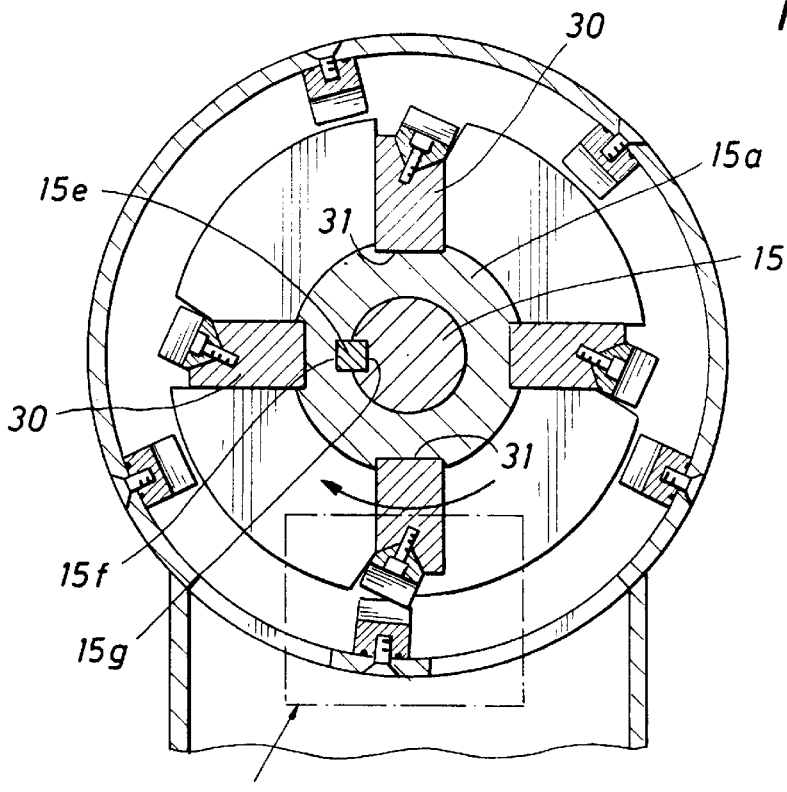
FIG. 4 is a sectional view taken on line 4—4 of FIG. 3 showing the details of the improved apparatus in the upper pre-grinded chamber.

In the drawings, the letter A refers generally to the apparatus of this invention which has a pre-grinding housing 10 in combination with a main grinding housing 12 positioned adjacent thereto. The housing 10 has an inlet 14 into which unconsolidated medical waste can be introduced from any source. A longitudinal shaft 15 extends through the housing 10 and is connected to a drive apparatus 16 such as a heavy duty 60 horsepower electric motor. At cut line 4—4, the shaft 15 has a sleeve 15a keyed to the shaft 15 with key 15e in key slots 15f and 15g. The sleeve 15a is on the left end of shaft 15, as seen in FIGS. 1 and 3. Thus, the sleeve 15a is secured at the left end of the shaft 15 for rotation therewith by the key 15c in the key slots 15f and 15g. An auger 15b is welded to the sleeve 15a for rotation with the shaft 15 to feed the unconsolidated medical waste in the housing from right to left as shown in the upper housing 10 in FIG. 1 of the drawings. At the left end of the housing 10, one or more fixed grinding teeth F are attached to the housing 10 at spaced circumferential positions as best seen in FIG. 4. The fixed teeth F co-act with one or more revolving teeth R, as will be explained more in detail. The shaft 15 is mounted at each end in suitable bearings 15c as will be understood by those skilled in the art.

Figure 7:
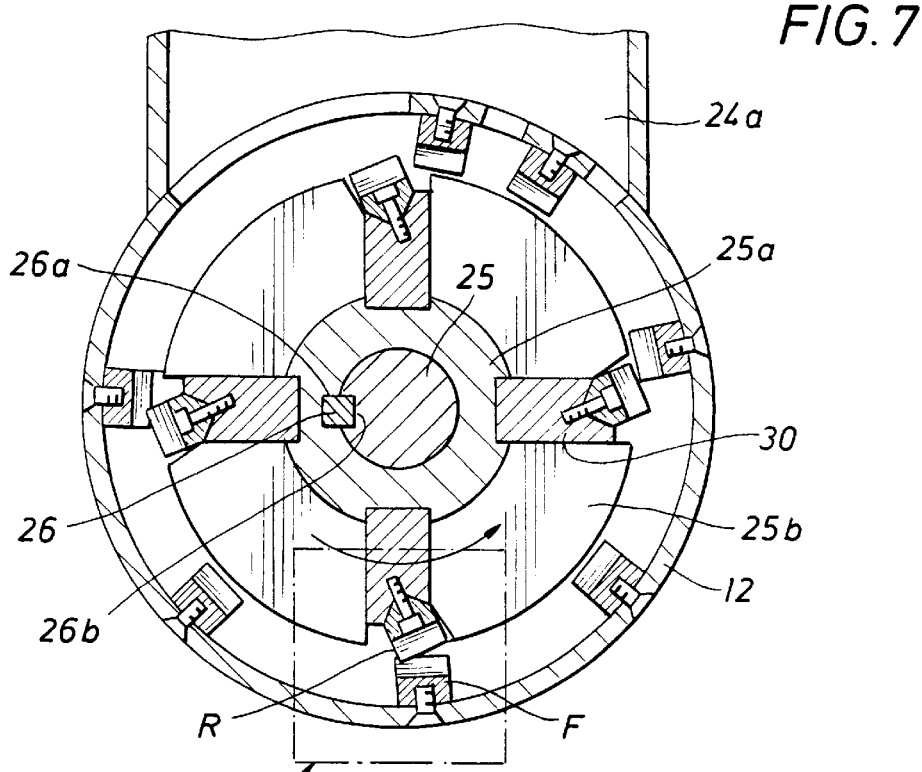
FIG. 7 is a sectional view taken on line 7—7 of FIG. 6 which shows the co-acting teeth on the main grinding apparatus of FIG. 6.

Filtered water is introduced into the housing 10 from a filtered source through a spray 20a. Also, a sterilant is supplied from a source 21 and is either sprayed or fed by gravity from a hopper 21 into the housing 10 for contact with the waste material that is introduced into the housing 10 through inlet 14. The medical waste is forced between the fixed teeth F and revolving teeth R by the auger 15b so that it is ground, shredded and/or cut into smaller waste in the housing 10, as will be more fully explained. The waste from housing 10 is discharged through an intermediate opening 22 to the interior of lower housing 24 of the main grinding apparatus which also has a shaft 25 extending through the housing 24 which is powered by another drive apparatus 26 such as an electric motor of 60 horsepower. The direction of movement of the waste in the housing 24 is thus preferably in reverse or counter to the movement in the housing 10 as can be seen in FIG. 1. A sleeve 25a is secured on the shaft 25 by a conventional key and slot arrangement such as key 26 in key slots 26a and 26b (FIG. 7). An auger 25b is welded or otherwise affixed to the sleeve 25a for accomplishing longitudinal forcing of the waste to co-acting fixed teeth F secured to the housing 12 and revolving teeth R secured on the sleeve 25a. The processed waste is preferably discharged from the lower right-hand end of housing 24 at a suitable opening 24a (shown in dotted lines) in the lower portion of the housing 24. Also, preferably the housing 24 is inclined downwardly towards the outlet 24b for facilitating the discharge of the processed waste therefrom. The shaft 25 is supported at each end in conventional bearings 25c. Also, a suitable framework H or external housing (not shown) is provided to support and preferably enclose the apparatus A.

Figure 2:
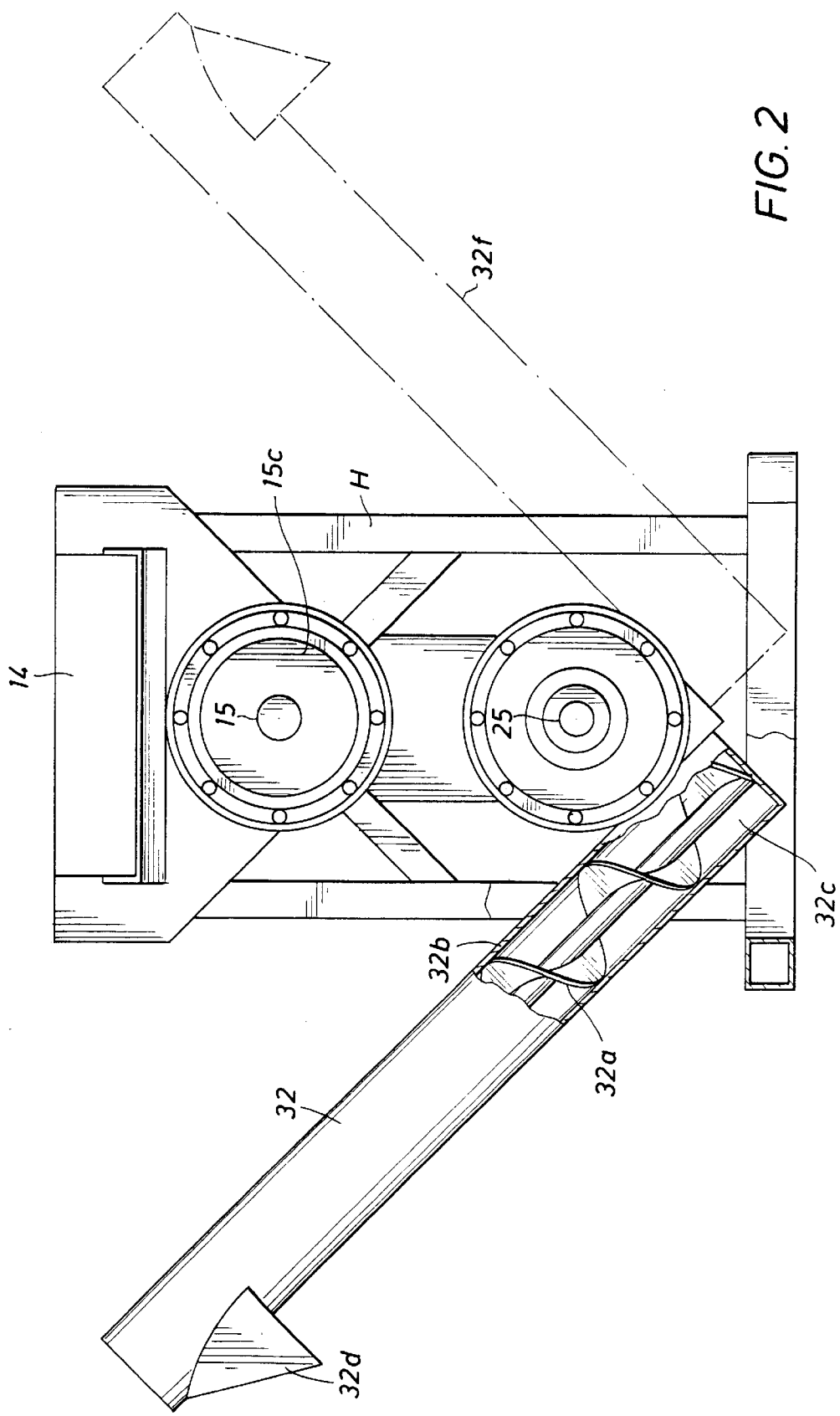
FIG. 2 is an end view of the apparatus of FIG. 1 illustrating an auger which may be used for discharging the processed waste from the apparatus.

Looking now at FIG. 2, which shows a discharge auger 32 which has a conventional auger blade 32a in a cylinder 32b, such auger 32 is adapted to receive the discharge of the processed waste from the outlet 24a into the lower end 32c of auger 32 and such waste is moved or augured upwardly to the discharge outlet 32d to deliver the waste to any suitable location for ultimate delivery to a waste site. Alternatively, the auger 32 may be on the right as shown in dot-dash lines 32f.

Figure 5:
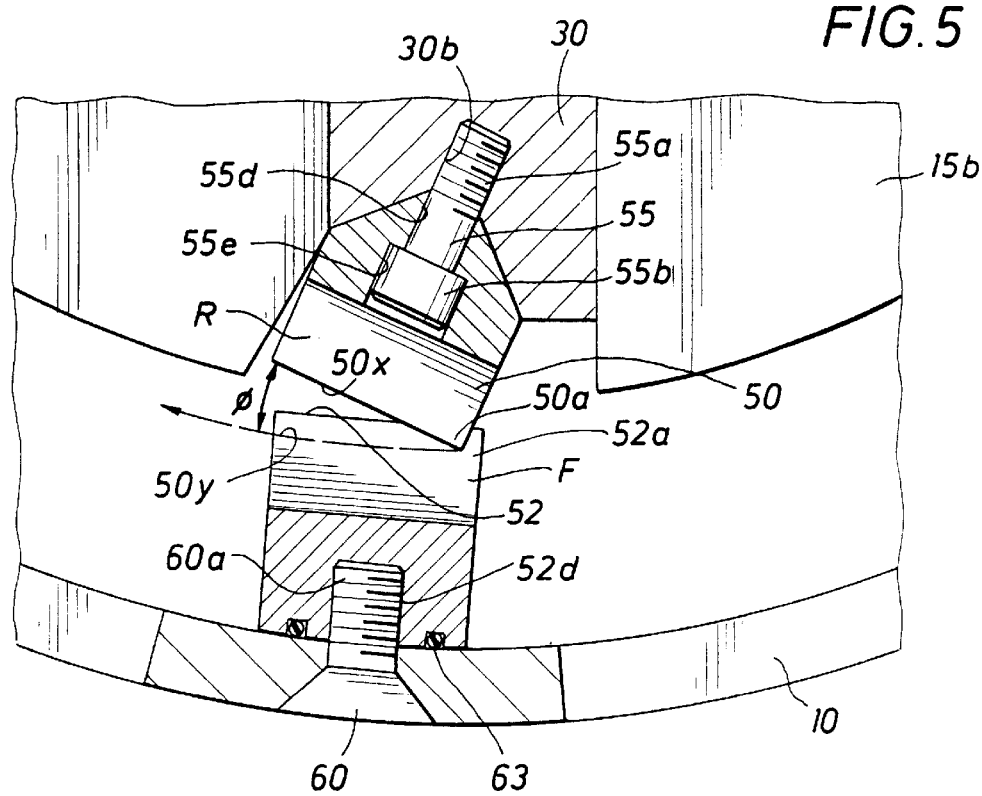
FIG. 5 is an enlarged view taken from FIG. 4 showing one of the rotating teeth co-acting with one of the fixed teeth in the apparatus.
Figure 6:
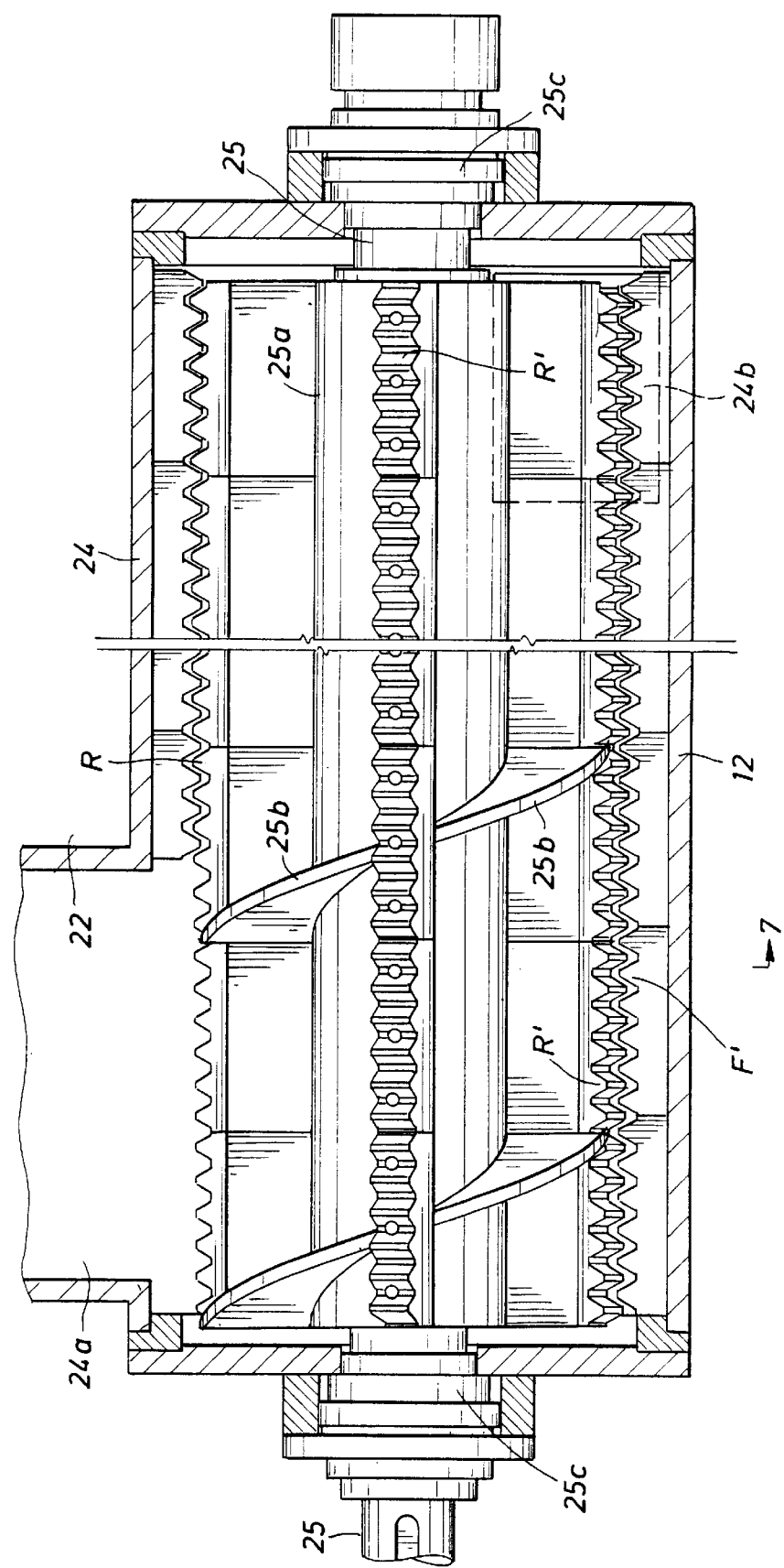
FIG. 6 is a sectional view of the main grinding chamber which receives the waste from the pre-grinded chamber thereabove for the final processing of the waste.

In FIGS. 4–6, in particular, the improvement is illustrated in enlarged views. As seen in FIG. 4, a plurality of support blocks 30, preferably four in number, are equally spaced circumferentially on the shaft sleeve 15a and are secured thereto by welding or otherwise affixing the inner ends 31 to the sleeve 15a. As best seen in FIG. 3, the blocks 30 are preferably arranged in longitudinal rows, and in FIG. 3, four blocks 30 are shown for each row, with abutting edges 30a of adjacent blocks engaging each other. Also, preferably, a row of revolving teeth R can be seen in FIG. 3 on each support block, so that the number of teeth R corresponds with the number of fixed teeth F in the housing 10 that are also preferably formed as a unit with blocks 40, with abutting edges 40a between the blocks 40. The teeth R and F are interfitting with a sufficient radial gap or space between the revolving teeth R and fixed teeth F into which space or gap the waste material is forced for the shredding, grinding and/or cutting of the waste material such as cloth or the like into small particles or pieces for packaging on disposal, as previously explained.

As seen in FIGS. 3 and 5, each tooth R is substantially V-shaped at 50 with the generally pointed end 50x of each tooth R fitting into, but slightly spaced radially from the substantially V-shaped groove or valley between adjacent fixed teeth F, as will be explained. Likewise, each pointed end 52 of each tooth F fits into, but is slightly spaced radially a selected amount from the groove or valley between adjacent revolving teeth R.

Each tooth R, which is preferably one of six formed together in a row as shown in FIG. 3, is removably attached to one of the blocks 30 with several bolts 55 which have threads 55a and a larger diameter head 55b than the body of bolt 55. The length of each bar 55c (FIG. 3) which has the teeth 50 formed therewith is the same length as each support block 30, and preferably each bar 55c which preferably has six teeth 50 is separately held by the bolts 55 which are threaded into a support block 30 with threads 30b in each block 30 (FIG. 5). Each bolt 55 passes through a bore hole 55d which is enlarged at 55e to receive the enlarged bolt head 55b.

In the present invention, rather than having each row of teeth R forming a revolving cutter assembly being positioned parallel to the fixed teeth F, as in U.S. Pat. No. 5,673,861, they are mounted at an oblique angle, as best seen in FIG. 5, and as explained below, so that as the teeth R are revolved relative to the fixed teeth F on the stationary cutter assembly, they force the waste material between the teeth F and R with a shredding, cutting and grinding action which enables the physical structure of waste material such as cloth blankets, sheets, clothes, and the like which are in medical waste to be successfully reduced into a medical residue of small pieces or particles with a minimum of shut-downs. Such result is accomplished without any, or with a minimum of, shut-downs caused by the binding or jamming of the rotation of teeth R by the fibrous material between the teeth R and F, which has been a problem in the past.

Also, as has been explained, the sleeve 15a has the auger 15b welded thereto with each half auger section preferably extending for the same longitudinal distance as the length of one of the supports 30, as best seen in FIG. 3. The auger 15b functions together with the movable teeth R as they co-act with the fixed teeth to force the waste material forward in the housing 10 and through and between the teeth R and F.

The radial space or gap between the revolving teeth R and fixed teeth F as viewed in FIG. 5 may be the same throughout the length of the teeth in FIG. 3 or it may be varied from right to left to increase the size reduction of the waste as it travels to the left as viewed in FIG. 3 to get the initial shredding, cutting and grinding action in the pre-grind chamber or housing 10, as explained below. Also, the gap between the teeth 50 and 52 (FIG. 5) in the housing 24 is preferably reduced by having each section of teeth R closer to the opposed section of teeth F as the waste is moved from left to right in housing 24, as explained more fully below.

Further, the oblique angle Ø of each tooth R may vary, and it is preferably between about 10° to about 45° degrees from the tooth's travel path 50y to its pointed lower surface 50x, so that trailing edge 50a of each tooth 50 enters the radial space between two of the adjacent teeth 52a as indicated in FIG. 5.

Such travel of each tooth R is thus on a circular path (as viewed in FIG. 5) as each tooth R moves between a pair of the adjacent teeth F, thus creating a powerful biting, pulling and tearing action on the waste which greatly enhances the shredding of cellulose waste material in particular.

Each section of teeth F which preferably has six teeth 52 in each block 40 between ends 40a, is secured to the housing 10 by bolts 60 which have threads 60a that are threaded into threads 52d. A seal ring 63 is positioned between the housing and the teeth F. Each revolving section and fixed tooth section is optionally removable from the housing 10 for replacement. The bolt 55 is unthreaded to remove the tooth R from each support block 30 and each bolt 60 is unthreaded to remove it from the housing 10.

Figure 8:
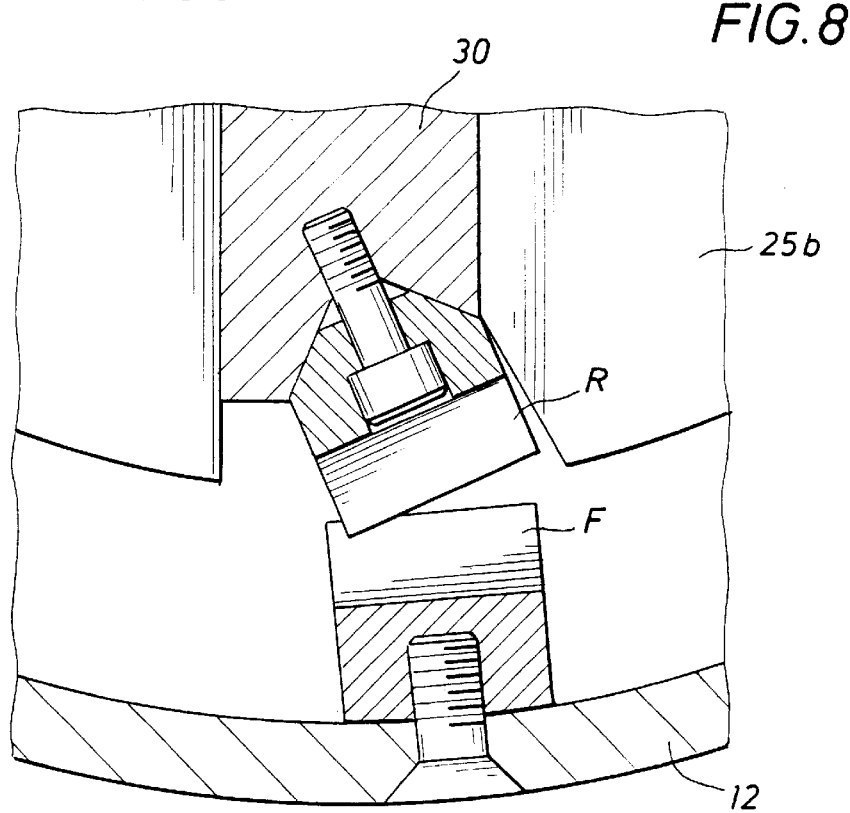
FIG. 8 is an enlarged view taken from FIG. 7 which shows the co-acting rotating and fixed teeth of the apparatus in the main grinding chamber.

Referring now to FIGS. 6–8, the details of the main housing 24 are shown on an enlarged scale, but the part numbers for the housing 24 and parts thereof are generally the same as in FIG. 1. When the waste material has been ground, shredded and cut by the teeth R being revolved relative to the teeth F, the waste material is fed by the auger 15b to the opening 24a at the left end of the housing 10, and then into the main housing 24, entering at the left end and moving counter-currently or in reverse relative to FIG. 1 through the housing 24 to discharge outlet 24b. Except for such opposite direction of movement of the waste, the teeth R and F, and the auger 25b are the same and have the same letters and numerals as those in FIGS. 1 and 3–5.

The teeth R are preferably made of an alloy with a 58–62 Rockwell hardness with a tungsten carbide surface or other hard surface materials on the outside of the teeth.

In the main housing 24, as particularly shown in FIGS. 6–8, the assembly for receiving the pre-ground waste from the first revolving and fixed teeth in FIG. 1 preferably has decreasing gaps between the teeth along the length of the shaft 25 to further reduce the size of the waste particles. For example, preferably the gap between the teeth on the first revolving and fixed teeth in housing 10 is within the range of about 0.50 inches to 0.75 inches, with the larger gap of 0.75 being at the right end of the teeth F and R, and the smaller gap of 0.50 being at the left portion of the teeth F and R. The gap between the second revolving and fixed teeth R' and F' in housing 24 is preferably within the range between about 0.75 inches to about 0.25 inches, with the larger gap of 0.75 being at the left end portion of the teeth R' and F' and the smaller gap of 0.25 being at the right portion of the teeth F' and R'.

It should be understood that the gap between the fixed teeth F and the revolving teeth R may be somewhere between the above examples, and likewise, the gap between the fixed teeth F' and the revolving teeth R' may also be somewhere between the above examples.

The reduced waste residue in housing 24 is finally augured or otherwise transferred to a packaging location or apparatus (not shown) for disposal or storage.

The foregoing disclosure and description of the invention are illustrative and explanatory thereof, and various changes in the details of the illustrated apparatus and construction and method of operation may be made without departing from the spirit of the invention.

The invention claimed is:

1. An apparatus for converting unconsolidated medical waste into a steriliant non-hazardous medical waste residue, comprising a first revolving cutter assembly having revolving teeth which interfit and co-act with first non-revolving fixed teeth on a stationary cutter assembly, said revolving and fixed teeth having a radial gap therebetween for receiving the medical waste, the improvement comprising:

each revolving tooth having a substantially pointed cutting surface which lies in its plane of rotation and is disposed at an oblique angle to its path of rotation and is inclined inwardly towards the center in the direction of rotation and relative to the stationary cutting teeth to engage the medical waste and apply a powerful shredding force on the waste material therebetween as each revolving tooth enters and moves through the radial gap between the revolving tooth and the valley between each pair of fixed teeth adjacent and opposed to each revolving tooth.

2. The apparatus of claim 1, including:

said revolving cutting assembly having a row of teeth in alignment with each other extending lengthwise of said shaft.

3. The apparatus of claim 2, wherein:

said revolving cutting assembly has a plurality of rows of revolving teeth mounted at spaced circumferential locations on a longitudinal shaft for interfitting with the opposing teeth at spaced circumferential locations.

4. The apparatus of claim 1, including:

a sleeve on said shaft, an auger formed on said sleeve which forces medical waste longitudinally at the same time as said revolving teeth engage the medical waste for applying pressure on the cutting teeth to effect the grinding, cutting and shredding action on the medical waste.

5. The apparatus of claim 1, including:

a second revolving cutter assembly and stationary cutter assembly which substantially duplicates said first revolving cutter assembly and said stationary assembly for receiving pre-ground waste but which has decreasing gaps between the teeth along its length compared to the gaps between the first revolving and fixed teeth to further reduce the size of the waste particles.

6. The apparatus of claim 5, wherein:

the gap between the teeth on the first revolving and fixed teeth is in a range from 0.50 inches to about 0.75 inches, and the gap between the teeth on the second revolving and fixed teeth is in a range of from about 0.75 inches to about 0.25 inches.

7. The apparatus of claim 1, including:

a sleeve on said shaft for rotation therewith, a radially extending support block affixed to said sleeve, and one of said revolving cuter assemblies being removably attached to said support block.

8. The apparatus of claim 1, wherein:

said oblique angle is from about 10° to about 45°, relative to the circular path of travel of the revolving teeth.

* * * * *